United States Patent [19]

Rypinski et al.

[11] 3,870,958

[45] Mar. 11, 1975

[54] CIRCUIT FOR APPLYING DATA SIGNALS ACROSS A MICROPHONE INPUT CIRCUIT

[75] Inventors: Chandos Arthur Rypinski, Tiburon; Jaime Ernesto Pera, Mill Valley, both of Calif.

[73] Assignee: RCA Corporation, New York, N.Y.

[22] Filed: Dec. 11, 1973

[21] Appl. No.: 423,688

[52] U.S. Cl. .......... 325/155, 179/15 AN, 179/15 BL

[51] Int. Cl. .......... H04b 1/02

[58] Field of Search .......... 179/1 F, 15 BL, 15 AN; 325/21, 102, 101, 155

[56] References Cited

UNITED STATES PATENTS

| | | | |
|---|---|---|---|
| 3,135,832 | 6/1964 | Feingold et al. | 179/15 BL |
| 3,654,394 | 4/1972 | Gordon | 179/15 BL |
| 3,801,919 | 4/1974 | Wilkes et al. | 179/15 AN |

*Primary Examiner*—Robert L. Griffin
*Assistant Examiner*—Aristotelis M. Psitos
*Attorney, Agent, or Firm*—Edward J. Norton; Robert L. Troike

[57] ABSTRACT

A circuit for coupling audio tone data signals from a source at the input end of a transmitter to which is also coupled a microphone includes a negative feedback amplifier characterized by a D.C. voltage at the output that remains close to that at the input.

4 Claims, 2 Drawing Figures

CIRCUIT FOR APPLYING DATA SIGNALS ACROSS A MICROPHONE INPUT CIRCUIT

BACKGROUND OF THE INVENTION

This invention relates to the coupling of audio tone data signals to voice radio transmitters. Specifically, this invention relates to a circuit for feeding audio tone data signals from a data source to a transmitter via the microphone coupling circuit to that transmitter.

It is known in the art to add audio tone data signals or data modulated audio frequency signals to a voice radio transmitter for a variety of auxiliary purposes. Such prior art where the audio tone data signals are separately introduced on the radio transmitter via a different input circuit than that of the microphone input circuit and where the audio tone data is maintained present for the duration of the transmission are distinct from this invention.

The special characteristic of the type of audio tone data transmission discussed herein is that it is short, always shorter than 2 seconds, and possibly as short as 50 milliseconds. The second particular characteristic arises from the common types of communications microphones, which include a transistor amplifier so that the audio carrying conductor in the coupling cable is also supplying D.C. power and may be fed from a source which has impedance, filtering or other variable characteristics. It is desirable to bridge the audio tone input signal modulated by the data source on this conductor so that a requirement for additional interconnection is not created by the addition of data capability to existing radios.

The difficulty in accomplishing a satisfactory interconnection arises from the fact that common capacitor coupling used to isolate two different D.C. states will cause a transient of sufficient time duration to interfere with the operation of the microphone and the correct modulation of the data message if it is switched on and off.

A further requirement is that the source impedance of the audio data circuit be so low when compared with that of the microphone that the ordinary voice currents in the lead will not pass and it will then be impossible for voice to interfere with the accuracy of the data transmissions. After the data transmission, the voice audio circuit must be unimpaired.

This invention is applicable to the case where the data transmission is initiated instantaneously and coincidentally with the beginning of a voice transmission. A delay is introduced whose duration is governed by the amount of time required for the transmitter to reach near full power and for the receiver to respond with switch through of the audio path to the decoding equipment. It is necessary to minimize this time interval and to transmit data at the highest possible speed, so that the loss of voice information at the beginning is minimized. In general, a loss of over ½ second will have some negative effect and become unacceptable at a delay of 1 second or more. The ears of experienced dispatchers have been found acute enough to detect differences in delay of cut-through as small as 50 milliseconds. The only conclusion to infer from the above statements is that minimizing to a fine point the time delay caused by data identification is important.

There are certain technical details which pose a problem for circuit designers who actually are trying to satisfy the above operational requirements. It is economical and simple to use electrolytic capacitors for the coupling circuits. These capacitors must necessarily be of large time constant so that the low frequency components of the data message arising from particular patterns of 1's and 0's not be distorted by material base line shift. The capacitors are in fact chosen to be many times larger than the operational minimum to provide for the loss of capacity from variations in manufacturing tolerance and temperature. This circuit can only be connected during the data message, and at all other times it must be disconnected so that the normal microphone voice circuit is in no way impaired.

For illustration of the problem, consider switching the audio driver circuit on and off the microphone circuit with relay contacts. A very low impedance driver could be formed and the coupling capacitors chosen large enough to present this low impedance to the microphone line. It will be found when this circuit is implemented that a very large, slow D.C. transient is introduced by the charging current of the coupling capacitor when the switch is closed. Further, the possibility of reducing the duration of this transient to damp out during the initial delay period is not possible when the other functional requirements above are considered.

The next step is to minimize the difference in voltage on each side of the capacitor before the switch is closed. This leads to further difficulties since the voltage on the microphone side of the switch is variable in different installations and not readily predicted by design engineers for a variety of field situations. Another difficulty arises from the fact that electrolytic capacitors are polarity sensitive and only display their desirable properties for one polarity of applied voltage. In an attempt to match the voltages on each side of the capacitor to avoid the charging current, the result is creation of a requirement for a high capacity nonpolar capacitor which, in the present state of the art, cannot be economically satisfied.

It may be seen that relay switching contacts are useful as an illustration, but do not meet an operational need unless associated with the other features of the circuit used in this invention, and at that point electronic switching becomes feasible and desirable.

BRIEF DESCRIPTION OF THE INVENTION

Briefly, an improved circuit for connecting audio tone data signals from a data source to the modulator of a transmitter via the microphone input cable to the modulator is provided by an audio amplifier and an A.C. coupling capacitor connected in series with the amplifier. The amplifier includes a negative feedback circuit and D.C. power supply coupling terminals for activating the amplifier. The amplifier is characterized by a high impedance when quiescent and low output impedance when active and a D.C. voltage at the output that remains close to that at the input such that the output voltage across the series capacitor does not change materially with activation or deactivation of the amplifier to couple or decouple the data signals. The amplifier is activated or deactivated by coupling power to or removing power from the power supply coupling terminals.

DETAILED DESCRIPTION OF THE INVENTION

Figure 1:
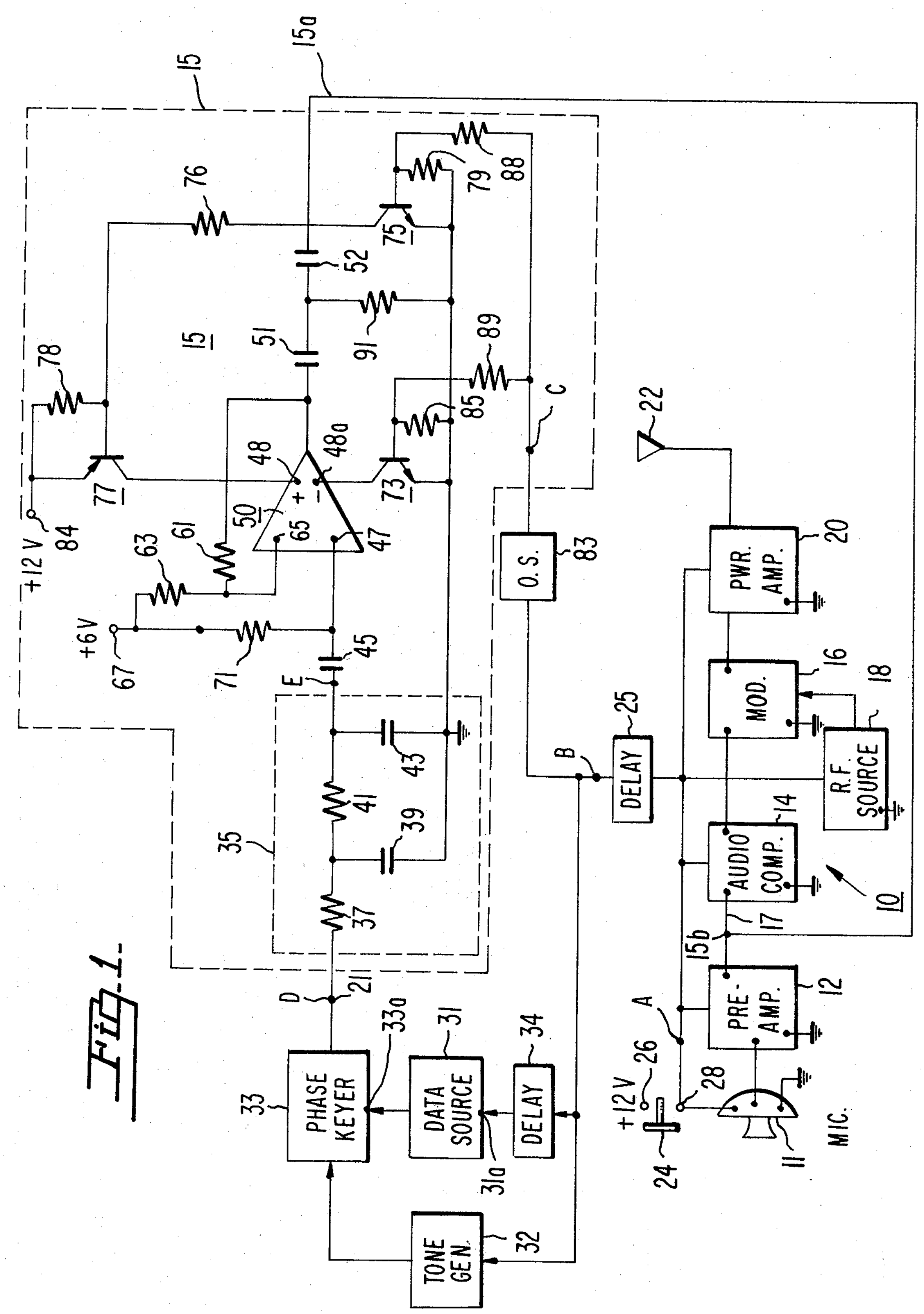
Figure 2:
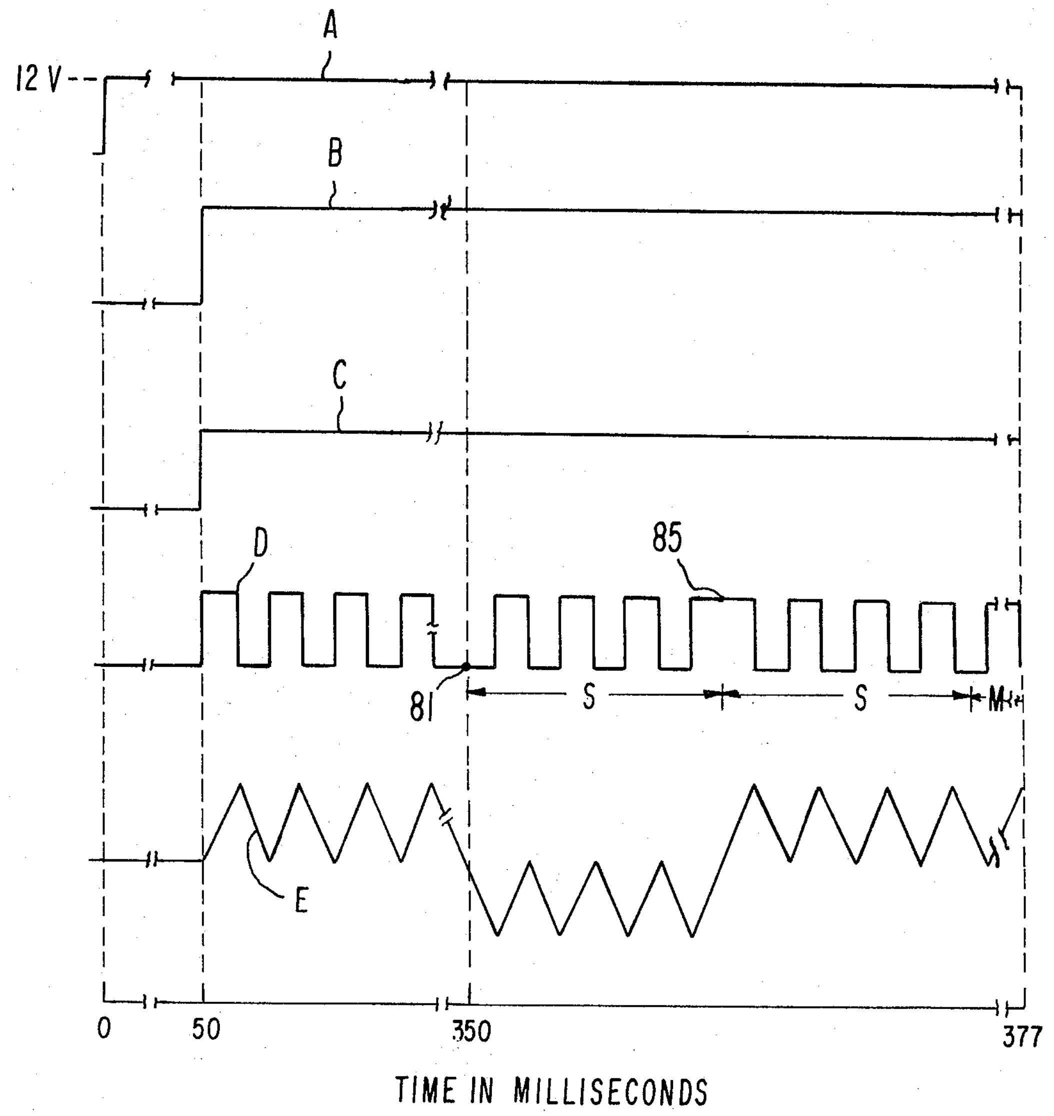

A more detailed description follows in conjunction with the following drawings wherein:

FIG. 1 is a schematic diagram of the circuit according to the present invention; and FIG. 2 is a series of waveforms useful in describing the operation of the circuit of FIG. 1.

Referring to FIG. 1, a transmitter system 10 is shown. The normal spoken voice input is provided by microphone 11 which may include an amplifier 12 therewith. The amplified voice signals from amplifier 12 are applied via cable 17 to the audio compression unit 14. At the audio compression unit the audio signals are first differentiated, then symmetrically clipped and then integrated and applied to an angle modulator 16. The purpose of the audio compression unit 14 is to prevent over modulation of the carrier. The R.F. (radio frequency) carrier is applied from R.F. source 18 to the modulator 16. The angle modulated R.F. output from the modulator 16 is applied through power R.F. amplifier stages 20 to an antenna 22.

The above describes a typical mobile transmitter. D.C. power supply to the transmitter 10 is provided through a push-to-talk switch 24. Upon pushing the push-to-talk switch 24 and closing the gap between contacts 26 and 28, 12 volts D.C. is applied to the stages of transmitter 10 and to the 50 millisecond delay 25. The 12 volts at point A in FIG. 1 is illustrated by waveform A of FIG. 2. At time equal to zero, or the time switch 24 closes contacts 26 and 28, a 12 volt rise occurs at point A as illustrated in FIG. 2. After a 50 millisecond delay afforded by the delay 25, +12 volts is applied to tone generator 32 and one-shot generator 83. The delayed 12 volts at point B in FIG. 1 is illustrated by waveform B in FIG. 2. The one-shot generator 83 is triggered in response to the delayed 12 volt signal to generate at point C a pulse indicated by waveform C in FIG. 2. The time duration of the pulse from one-shot generator 83 is determined by the desired length of a front porch tone and a data message. This will be discussed in subsequent paragraphs. The 50 millisecond delay allows time for the transmitter 10 to warm up before sending any tone or message. After the delay of 50 milliseconds, the tone generator 32 is energized and a 1,200 cps (cycles per second) tone, for example, is generated and coupled via a phase keyer 33 and a circuit 15 to a point 15*b* in transmitter 10. This point 15*b* is along cable 17 just prior to the audio compression unit 14. The 1,200 cps tone is compressed and angle modulated at modulator 16 on the R.F. carrier from source 18 and is transmitted out over antenna 22. This 1,200 cps tone is transmitted through the phase keyer 33 without any additional phase shift to circuit 15. This 1,200 cps tone is made up of square wave pulses which continue for a period of time such as 300 milliseconds in the herein described example. This 1,200 cps tone is sent for a period of time sufficient for the remote receivers to decode the tone and allow the appropriate receivers to receive a data message to follow. Dependent upon the system, the time period for the continuous tone may be anywhere from 50 to 2,000 milliseconds. In the example contained herein, the tone is transmitted for 300 milliseconds and is illustrated by waveform D in FIG. 2.

After transmission of the unmodulated tone for the 300 milliseconds, for example, a data message is sent. In this system the message is sent using differential phase shift keying via phase keyer 33. In this type of system, a data message is made up of a series of marks (logic one) and spaces (logic zero). In this particular system 180° phase shift of the 1,200 cps wave tone over a bit time period makes it a space information bit and no phase shift of this tone over a bit time period makes it a mark information bit. As mentioned above the 1,200 cps square wave is produced at tone generator 32 and is applied to phase keyer 33. Phase keyer 33 is adapted to apply signals without phase shift to point 21 upon the application of a first signal level at terminal 33*a* and to apply signals with 180° phase shift to point 21 upon the application of a second signal level at terminal 33*a*. A data source 31 coupled to terminal 33*a* normally applies the first signal level to terminal 33*a* and consequently the initially generated tone is sent through phase keyer 33 to circuit 15 without any phase shift.

After a 300 millisecond delay, for this example, following application of power to tone generator 32, the data source 31 receives power at terminal 31*a* via delay 34. When the data source 31 is energized at terminal 31*a*, the data message providing a first signal level for a mark information bit and a second signal level for a space information bit is enabled and sent to terminal 33*a* of phase keyer 33. Each information bit is for example four cycles long at the 1,200 cps rate. Each data message is, for example 8 bits long. In the example illustrated in FIGS. 1 and 2, two space information bits are first transmitted as indicated at points 81 and 85 of waveform D by a 180° phase reversal after four cycles. Following the two space bits, a mark information bit is transmitted as indicated by no phase reversal after four cycles past point 85. Following the mark information bit five more information bits, not shown, are transmitted. The total date message is transmitted for about 27 milliseconds. This may be repeated several times. In order to practically illustrate the timing of the system in FIG. 1, only portions of the waveforms in FIG. 2 are shown with the omitted portions indicated by broken lines. The actual waveforms are much longer in time than illustrated. The data message may be an identity code indicating the transmitter sending the transmissions.

The audio tone data message of waveform D is applied from phase keyer 33 to a waveshaping network 35. The waveshaping network 35 includes a pair of RC integrating circuits—the first including resistor 37 and capacitor 39 and the second including resistor 41 and capacitor 43. The resulting waveform E of FIG. 2 is an approximation of a triangular wave of the square wave applied thereto. This waveshaping is adjusted to provide an output wave which, when processed by a following pre-emphasis network (differentiator) and limiter in the audio compressor 14 will result in a minimum loss of RMS value in the recovered waveform. The Federal Communications Commission (FCC) regulations in vehicular and portable transceivers require the use of a frequency deviation limiting circuit. The audio compressor 14 provides this function. This audio compression circuit tends to limit and square the peaks of any input waveform which has excess amplitude. The pre-emphasis network prior to limiting (the differentiating network) provides an amplitude response which makes the radio modulation circuit more sensitive to high frequencies at a slope of 6 db per octave.

When a sine wave such as from voice is applied to this circuit, the output remains a sine wave with the amplitude depending upon frequency. When a square wave is applied to this circuit such as from a data message, however, it is differentiated, resulting in a series of spikes of alternating polarity at the time of the transitions. To provide maximum recovered energy from the data signal, it is necessary that the FM discriminator output in the receiver provide a waveform which has the highest possible RMS value since there is a fixed limit on the peak value imposed by FCC rules as well as technical limitations. With the previously described differentiation process to the square wave, the waveform is peaked at the output of the discriminator and does not have an RMS value which can be obtained by increasing the area under the pulses. The integrated pre-emphasis waveshaping network 35 modifies the waveshape of the data so that the waveform appearing at the output of the receiver discriminator has the highest available RMS value as compared with its peak value. The waveshaping network will also result in a minimum loss of RMS value in the recovered waveform as a result of excessive amplitude input.

The output from the waveshaping network 35 is coupled through coupling capacitor 45 to the lower input 47 of operational amplifier 50. The amplifier 50 when activated provides amplified replicas of the input audio signal which is then coupled through coupling capacitors 51 and 52 and wire 15*a* to the coupling cable 17 between preamplifier 12 and audio compressor 14. The amplifier 50 is for example an operational amplifier of the integrated circuit type which is commonly referred to as the type 741 operational amplifier. This amplifier is sold by many manufacturers such as RCA Corp., Texas Instruments, Fairchild etc. Although the manufacturers identify the circuit with the same last three numbers 741, they are all prefixed by different numbers. The RCA Corporation circuit labels this circuit the PA 7741 series integrated circuit. Fairchild Semiconductor lables this circuit the μA 741 integrated circuit. It is a characteristic of this integrated circuit that by the use of the negative feedback circuit as provided via resistor 61 to upper terminal 65 and resistor 63 to terminal 67 the circuit may be caused to have a low output impedance. It is also a property of this circuit that the D.C. voltage of the output may be made close to that of the input. This condition is true when the operational amplifier 50 is active due to the negative feedback circuit and it continues to be true with the operational amplifier inactive because of the passive D.C. path through the series resistor network of resistors 61 and 63 to capacitor 51. A six volt supply is coupled to terminal 67 and via resistor 71 to input terminal 47 and via feedback resistors 61 and 63 to the output of operational amplifier 50. The output voltage at the first output capacitor 51 does not change materially with the application of power to activate the operational amplifier 50 or upon deactivation of this operational amplifier 50.

The operational amplifier 50 is activated and inactivated by the operation of transistorized switches 73, 75 and 77 in response to the closing of push-to-talk switch 24 and operation of delay 25 and one-shot generator 83. Transistor 77 is a PNP transistor with its emitter terminal coupled to terminal 84. Twelve volts from an external source is applied to terminal 84. The collector terminal of transistor 77 is coupled to the plus (+) supply terminal 48 of integrated operational amplifier 50. The base-emitter junction of transistor 77 is biased off by resistor 78. The base of transistor 77 is coupled via lead resistor 76 to the collector of NPN transistor 75. Forward bias of the base-emitter junction of transistor 75 is afforded by resistor 79. The emitter of transistor 75 is connected to ground potential. The transistors 75 and 77 in their quiescent state are open. The NPN transistor 73 is biased similarly to transistor 75 using resistor 85 to afford forward bias of transistor 73 upon application of voltage thereto. The emitter of transistor 73 is connected to ground potential and the collector is connected to the minus terminal 48*a* of operational amplifier 50. In the quiescent state with zero voltage applied to the base of transistor 73, the transistor 73 provides essentially an open circuited connection between terminal 48*a* of operational amplifier 50 and ground.

The terminal 28 of push-to-talk switch 24 is coupled through the delay 25 to the one-shot generator 83. The one-shot generator 83 may be a one-shot multivibrator circuit which in response to an increase in voltage applied thereto of 12 volts provides an output pulse of 12 volts for a fixed time period equal to the expected time period (8 bits) of the data message and the unmodulated tone (327 milliseconds). The output pulse from one-shot generator 83 is illustrated by waveform C in FIg. 2. The increased output level from the one-shot generator 83 is applied across load resistors 88 and 89 to the bases of transistors 75 and 73 respectively. This causes these transistors 73 and 75 to conduct connecting terminal 48*a* of amplifier 50 to ground or reference potential and producing increased current conduction through transistor 75 and consequently the forward biasing of transistor 77. With forward bias on transistor 77, the 12 volts at terminal 84 is applied to the positive supply terminal 48 of operational amplifier 50 and the amplifier 50 is activated. The operational amplifier 50 remains activated for the fixed time period as governed by the time period of the output pulse from one-shot generator 83. Upon the termination of this pulse at a time period of 327 milliseconds, for example in FIG. 2, the transistors 73, 75 and 77 are again switched off in response to level changes in the output of one-shot generator 83. The activating 12 volt bias is removed from terminal 48, and the reference level is removed from terminal 48*a* of operational amplifier circuit 50.

When the operational amplifier 50 is activated by the pulse (waveform C) from generator 83, the output impedance is about 50 ohms. Since the microphone impedance of microphone 11 is on the order of one thousand ohms, the data passes substantially uunaffected by any voice signals to the audio compressor 14, the modulator 16, the amplifier 20 and out antenna 22.

A high valued (22 K for example) resistor 91 is coupled between the junction of series capacitors 51, 52 and ground potential. When the operational amplifier 50 is deactivated by removal of the bias to switching transistors 73, 75 and 77, a substantially infinite impedance is presented at the output of the operational amplifier 50 and the voice signals from microphone 11 are applied via cable 17 unimpeded to modulator 16 and out of the transistor 10. This substantially infinite impedance is provided by the high valued resistor 91.

The output from the operational amplifier 50 when activated provides a D.C. level of about 6 volts across capacitor 51. When the operational amplifier 50 is inactivated with essentially open circuit connections to terminals 48 and 48*a* due to operation of transistors 73, 75 and 77, the D.C. level of about 6 volts remains across capacitor 51 due to the output being coupled via resistors 61 and 63 to the 6 volt source at terminal 67. Since the voltage at the output remains substantially constant whether or not the operational amplifier is switched on or off, the D.C. transient normally associated with the charging current of the coupling capacitor when the switch is closed is essentially eliminated. The two capacitors 51 and 52 are polarized electrolytic capacitors. These are connected back to back to form a nonpolar capacitor. The effect of the nonpolarized capacitor formed by the back to back polarized capacitors 51 and 52 is to block D.C. voltages associated with variations in reference voltages from the microphone circuit. These variations in voltages are due to the reference levels at the microphone preamplifiers 12 having plus (+) or minus (−) values depending on the installation. In one application of the circuit 15 in FIG. 1, the following values were used:

Amplifier 50 — RCA IC PA 7741
Resistors 37, 41, 63, 71, 79 and 91 are all 22 K ohms
Resistor 61 is 47 K ohms
Resistors 78, 76, 85 and 89 are all 10 K ohms
Resistor 88 is 82 K ohms

What is claimed is:

1. In a radio transmitter including a microphone connected by a transmission line to the modulation portion of the transmitter, an improved circuit for coupling audio tone data signals from a source across said transmission line in a manner to avoid D.C. transients associated with the coupling and decoupling of the data signals across the input end of said modulating portion of said transmitter comprising:

an audio amplifier and an A.C. coupling capacitor connected in series between said source and said input end of said modulating portion of said transmitter, a resistive load coupled across the output of said amplifier for presenting a high impedance to voice signals from said microphone, said amplifier including a negative feedback circuit and D.C. power coupling terminals for activating said amplifier, said amplifier characterized by a low output impedance when activated and a D.C. voltage at the output that remains close to that at the input such that the output voltage across said capacitor does not change materially with activation and deactivation of said amplifier to couple and decouple said data signal whereby said D.C. transient voltages are minimized, means coupled to said power coupling terminals for applying power to activate said amplifier and apply said data signals to said transmitter.

2. The combination claimed in claim 1 wherein said means includes timed means for deactivating said amplifier after a time period sufficient for the transmission of a desired data message.

3. The combination claimed in claim 2 wherein said timed means includes a pulse generator.

4. The combination claimed in claim 1 including an integrating pre-emphasis network and an audio compression network coupled between said amplifier and said modulating portion of said transmitter.

* * * * *